May 7, 1935.  G. McF. MOOD  2,000,781
WATER MOTOR
Filed April 7, 1932  2 Sheets-Sheet 1
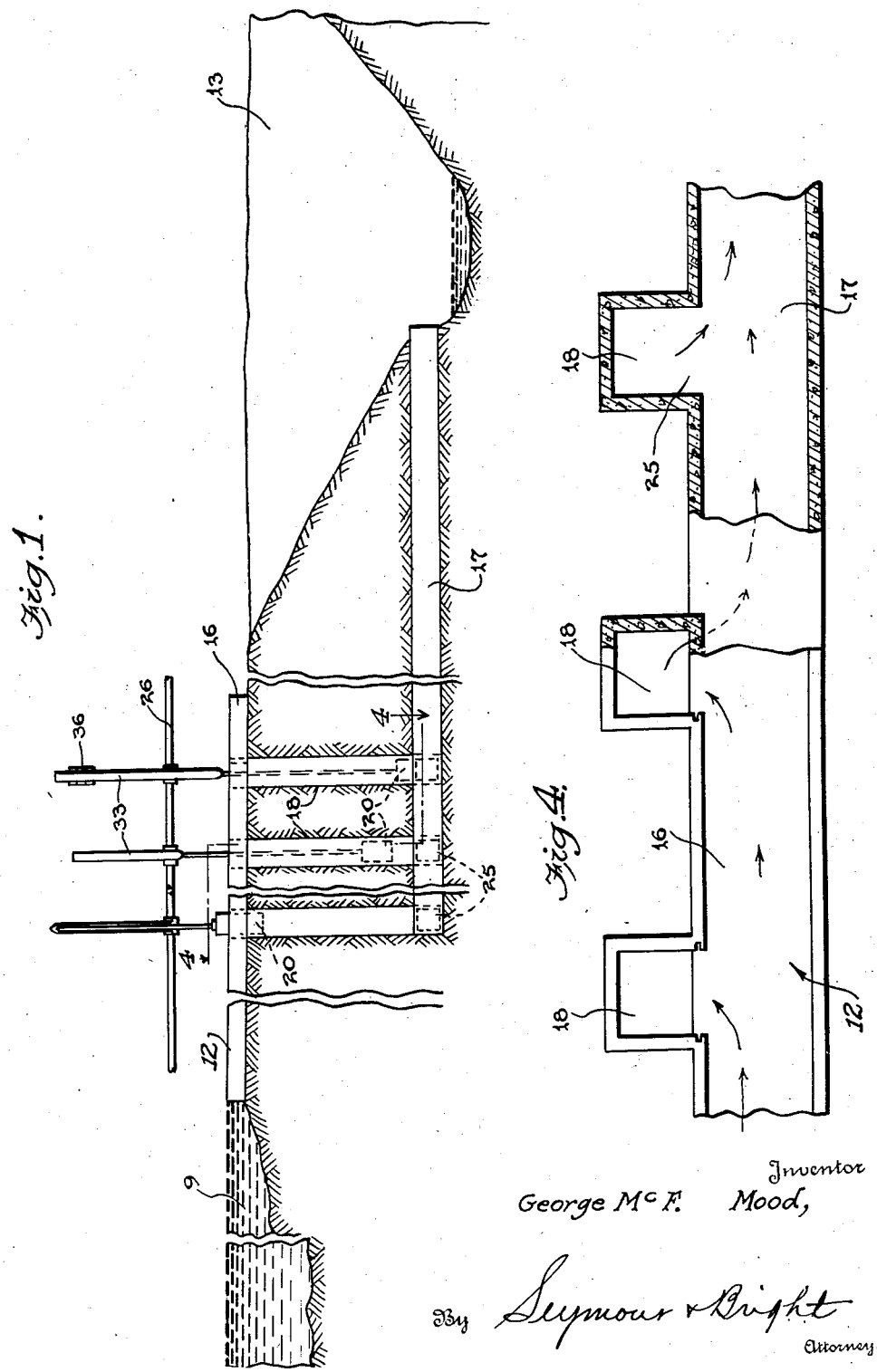
Inventor
George McF. Mood,
By Seymour & Bright
Attorneys May 7, 1935.　　　　　G. McF. MOOD　　　　　2,000,781
WATER MOTOR
Filed April 7, 1932　　　2 Sheets-Sheet 2
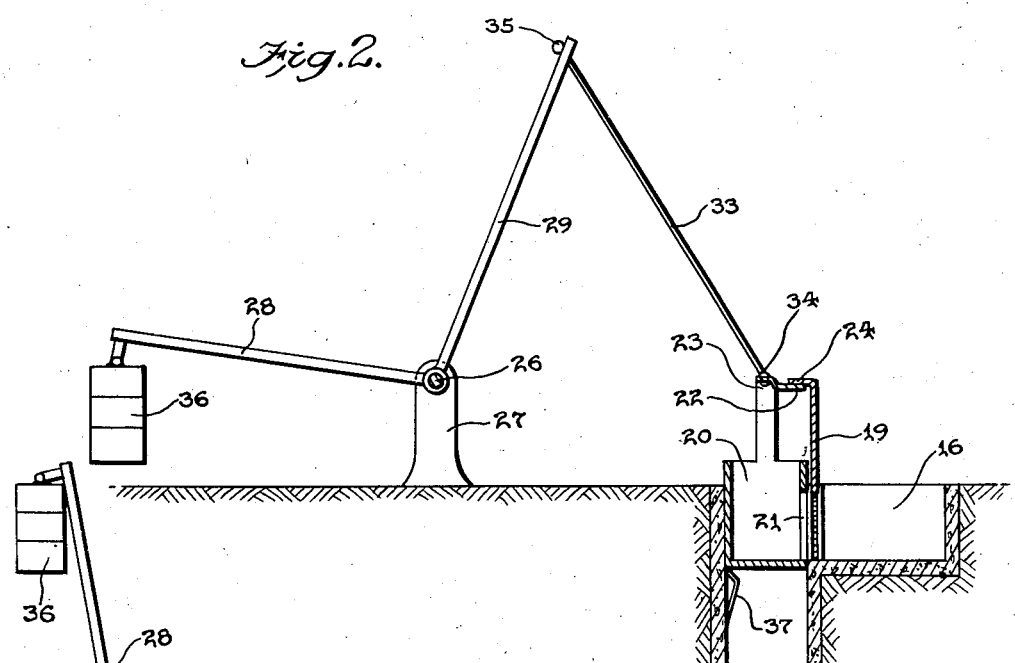
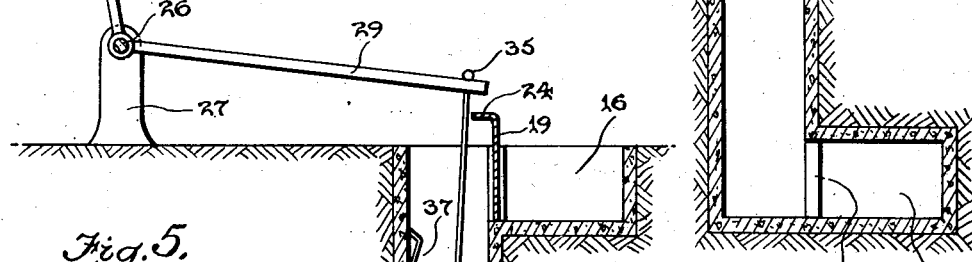
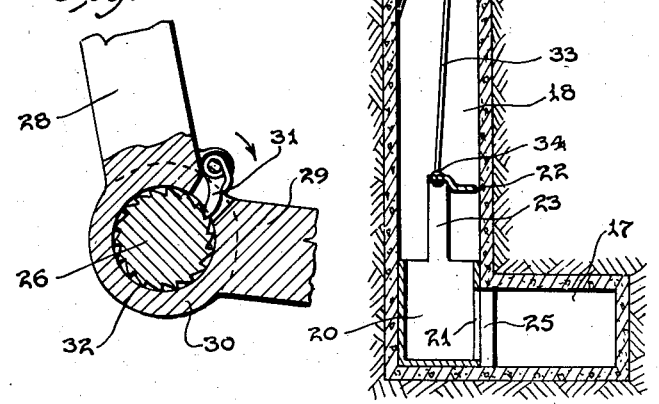
Inventor
George McF. Mood,
By Seymour & Bright
Attorneys Patented May 7, 1935

2,000,781

UNITED STATES PATENT OFFICE 2,000,781

WATER MOTOR

George McF. Mood, Charleston, S. C.

Application April 7, 1932, Serial No. 603,848

8 Claims. (Cl. 253—19)

This invention relates to improvements in apparatus for utilizing tidal ebb and flow, river water or other source of water supply in the development of power.

One of the objects of the invention is to automatically store water in a reservoir during high tide, or from a flowing stream or the like, feed this water constantly to a drainage creek or the like, and to utilize the water on its way from the supply pond to the drainage creek to operate reciprocating buckets, the movements of which are applied to a rotatable shaft or the like.

My improved apparatus has been devised with a view of obtaining power through the use of tide water, river water, or other suitable source of water supply, the mechanism being so designed as to make use of a quantity of this water for its weight. The weight of the water is made use of by means of a fall of about five feet measured from the surface of the source of supply to a dry pond, drainage creek or the like. In order to use the weight of the water for the production of power, it is necessary that a lower lever, approximately five feet lower than the upper level of the water supply pond or the like be constantly maintained so that the water used by the machine, through the normal laws of gravity, flow away from the machine so as not to impede the work of the machine by accumulating and gradually rising in it. For this purpose, any suitable drainage pond or creek may be provided for constantly maintaining the lower level approximately five feet lower than the upper level of the river stream.

A further object is to provide apparatus in which buckets are mounted in a plurality of wells and alternately or simultaneously raised and lowered, said buckets being adapted in their movement to receive and discharge water at different levels in said wells, and also to actuate mechanism for converting the reciprocatory motion thereof into rotary motion.

A still further object is to provide gates at the upper extremity of the wells, and means on said buckets actuating said gates for controlling the flow of water from the supply pond to said wells.

To recapitulate, it is contemplated to use the weight of a quantity of water, maintained at a five foot level, bearing upon a surface through a drop of five feet; this five foot level being maintained by the inflow of tide twice in twenty-four hours. The five foot drop from this high level to a dry pond or low tide level is maintained through each twenty-four hour period by the drainage of the contemplated dry pond twice in each twenty-four hours, by the fall of tide to a low water level approximately five feet lower than it is at high water level, the return of tide water into this dry pond being prevented by suitable dams and gates, allowing an outflow but no inflow of water.

With the foregoing objects outlined and with other objects in view which will appear as the description proceeds, the invention consists in the novel features hereinafter described in detail, illustrated in the accompanying drawings, and more particularly pointed out in the appended claims.

Fig. 1 is a side elevation, partly in section, of my improved apparatus.

Fig. 2 is a side elevation, partly in section, of a detail of my apparatus, and showing one of the buckets in uppermost position; said view being taken at right angles to Fig. 1.

Fig. 3 is a similar view with the bucket in lowermost or dumping position.

Fig. 4 is a sectional view on the line 4—4 of Fig. 1.

Fig. 5 is a sectional view partly in elevation of one of the ratchet devices used for driving the power shaft from one of the lever assemblies.

The apparatus illustrated is devised, for example, to utilize water from a stream 9 or the like, and in accordance with the present invention, this water flows by gravity through a sluice-way 12 into a drainage creek or basin 13, which is preferably arranged at an elevation below that of the upper portion of the stream or other suitable source of water supply 9.

As best shown in Figs. 1 to 4 inclusive, the sluice-way comprises an upper duct 16 and a lower duct 17 which communicate through vertically disposed shaft passages or chutes 18. Communication between the two ducts is normally prevented by sliding gates 19 which cut off the flow from the upper duct to the passages 18.

A bucket 20 reciprocates vertically in each chute 18, and each bucket has an opening 21 in its side to receive water from the duct 16 when the bucket is in uppermost position. In that position, an abutment 22 on the handle 23 of the bucket engages an abutment 24 on the gate 19 and holds the gate in elevated position to permit the water to flow from 16 into the bucket. When the bucket has been filled with water, it will descend in the chute 18, and as soon as its side opening 21 communicates with a port 25 at the lower end of the chute, the water will flow out into the discharge duct 17. Obviously, as the bucket descends, the abutment 22 in moving away from the abutment 24, will permit the gate 19 to close by gravity, so that no water will flow into the chute 18 while the bucket is descending.

In order to utilize the downward movement of the buckets for power purposes, I arrange along the duct 16, a rotatable shaft 26 supported on suitable bearings 27. On the shaft, I mount bell-crank levers consisting of arms 28 and 29 which merge into one another by means of a collar 30. Such collar carries a spring pressed pawl 31 that cooperates with ratchet teeth 32 on the shaft.

A rod or connection 33 has its ends connected respectively by universal joints 34 and 35 to a handle of one of the buckets and to the outer end of the arm 29. A counter-weight 36 is carried by the outer end of the arm 28, and it is heavier than an empty bucket 20, but lighter than a full bucket.

For the purpose of yieldingly supporting each of the buckets in uppermost position, so the bucket will not start to descend until it is full, I preferably provide each chute with a spring detent 37 which is strong enough to hold the bucket until the bucket is nearly filled with water, but which has insufficient strength to hold the bucket when it is completely filled.

It will be noted that there is a bell-crank lever and counter-weight for each one of the buckets, and in order for the power to be applied to the shaft 26 evenly, it may be necessary to regulate the opening and closing of the trap doors 19 by some suitable automatic timing device which will operate the same in series.

From the above it will be understood that the mechanism consists of the shaft 26 to be rotated by the bell-crank lever 28, 29 at the distal end of which is attached a piston-like bucket 20, with an opening 21 to receive a quantity of water from the supply duct 16. This quantity will be sufficient in weight to rapidly lower the bucket a distance of say five feet. In doing this, the bell-crank lever will rotate the shaft 26 through an arc of approximately 45 degrees.

As the bell-crank lever works on the shaft through the instrumentality of a pawl and ratchet device, it will be understood that the lever runs free when the bucket is drawn upwardly, but the pawl will catch on the ratchet teeth and turn the shaft when the lever is lowered by the weight of the water deposited in the bucket.

The supply duct 16 which carries the water from the supply pond or stream 9 to the machine, has its upper edge on a level with the supply pond, as shown in Fig. 1, and the duct 16 is preferably about 12 inches deep and of a width sufficient to bring to the motor at all times the amount of water necessary to supply water substantially 12 inches in depth to each one of the buckets.

When the bucket is forced up by the counter-weight 36, the gate 19 being opened, water to the depth of about 12 inches flows from 16 through 21, into the bucket, adding a weight sufficient to cause the piston-like bucket to drop through the shaft 18 a distance of about 5 feet to the opening 25, through which the water is discharged into the duct 17. As soon as the bucket is loaded and starts to descend, the controlling gate 19 automatically closes, and when the bucket reaches the bottom of the shaft 18, it is immediately emptied into the duct 17, the floor of which is approximately two inches above the bottom of the dry pond or drainage creek 13. The water flowing through the waste duct 17 is distributed over the dry pond or creek at a level of approximately five feet below the level at which it was obtained from the supply duct 16.

It can at once be seen that if several bell-crank levers should be attached with their buckets and counter-weights to the shaft 26, the movements can be so timed that as soon as the first bucket reaches the lower level, the second one will have been loaded and start its descent, and so on, so that the shaft can be made to rotate through an arc on 360 degrees and be kept rotating without cessation as long as water from the supply pond or stream flows through the duct 16 in sufficient amount to supply the necessary load or weight to the individual buckets to rotate the shaft.

With a river stream or supply pond 9 of sufficient capacity, it is evident that there need never be any material diminution of the depth of the water in the supply duct 16. Likewise, with a sufficient dry pond or drainage creek 13 maintained at a low water level, that is, at approximately two inches below the floor of the duct 17, it will be seen that the outflow from the waste duct 17 will never be hampered.

The machine, once started, with a river stream or supply pond 9 maintained at the desired water level, and with a dry pond or drainage creek 13 maintained at a low level as above explained, the gates 19 regulating the supply of water to the buckets being once adjusted as far as the time of filling is concerned, so that each lever will take up its pull on the shaft in definite sequence, it is manifest that the shaft 26 will be rotated with a power dependent directly upon the length of the arms 29, the number of bell-crank levers and the water capacity of the buckets without any interruption whatever.

It is obvious that power may be taken off the shaft 26 by any suitable means, such as a pulley 26a, and may be utilized for any suitable purpose.

While I have disclosed what I now consider to be a preferred embodiment of the invention in such manner that the same may be readily understood by those skilled in the art, it is apparent that changes may be made in the details disclosed, without departing from the spirit of the invention, as expressed in the claims.

What is claimed and desired to be secured by Letters Patent is:

1. Apparatus of the character described, comprising a sluice-way consisting of an upper supply duct and a lower waste duct communicating through hollow shaft passages, buckets mounted for reciprocation in said shaft passages and arranged to receive water from the supply duct, said buckets descending in the shaft passages, due to the weight of the water received and acting to dump said water into the waste duct, means for raising each bucket independently of the other buckets after said bucket has dumped its contents into the waste duct, and means for utilizing movements of each bucket for generating power.

2. Apparatus of the character described, comprising a sluice-way consisting of an upper supply duct and a lower waste duct communicating through hollow shaft passages, buckets mounted for reciprocation in said shaft passages and arranged to receive water from the supply duct, said buckets descending in the shaft passages due to the weight of the water received and acting to dump said water into the waste duct, means for raising the buckets after they have dumped their contents into the waste duct, means for utilizing movements of the buckets for generating power, and gates normally closing communication between the supply duct and the passages and engageable by the buckets and actuated thereby.

3. Apparatus of the character described, comprising a sluice-way consisting of an upper supply duct and a lower waste duct communicating through hollow shaft passages, buckets mounted for reciprocation in said shaft passages and arranged to receive water from the supply duct, said buckets descending in the shaft passages due to the weight of the water received and acting to dump said water into the waste duct, means for raising the buckets after they have dumped their contents into the waste duct, means for utilizing movements of the buckets for generating power, gates normally closing communication between the supply duct and the shaft passages, and cooperating abutment surfaces on the gates and buckets for actuating said gates.

4. Apparatus of the character described, comprising a sluice-way consisting of an upper supply duct and a lower waste duct communicating through hollow shaft passages, buckets mounted for reciprocation in said shaft passages and arranged to receive water from the supply duct, said buckets descending in the shaft passages due to the weight of the water received and acting to dump said water into the waste duct, means for raising the buckets after they have dumped their contents into the waste duct and means for utilizing movements of the buckets for generating power, the last mentioned means including a rotatable shaft, a lever movably mounted on the shaft, a connection joining said lever to one of said buckets, and a cooperating pawl and ratchet teeth for transmitting movements of the lever in one direction to said shaft.

5. A mechanism of the character described, comprising an upper water supply duct, a lower waste water duct, vertical shaft passages placing said ducts in communication, reciprocating buckets in the shaft passages to receive water from the supply duct and to be lowered by the weight of such water until the buckets dump the water into the waste duct, gates for controlling communication between the supply duct and the shaft passages, means carried by the buckets for actuating said gates, a rotatable power shaft provided with ratchet teeth, bell-crank levers loosely mounted on the shaft and having pawls to engage the ratchet teeth for driving the shaft, a connection joining one end of each lever to one of the buckets, and a counter-weight carried by the other end of each lever.

6. An apparatus of the character described, comprising a sluice-way consisting of an upper supply duct and a lower waste duct communicating through hollow vertical shaft passages, cup-shaped buckets mounted for reciprocation in said shaft passages and arranged to receive water from the supply duct, each bucket having an opening in its side so that the buckets descending in the shaft passages due to the weight of the water received will discharge said water into the waste duct, each passage having an inlet, gates controlling the inlets of the shaft passages, means on the buckets engageable with the gates for controlling the latter, a shaft arranged parallel to said sluice-way and provided with ratchet teeth, bell-crank levers having their medial portions pivotally mounted on the shaft, pawls mounted on the bell-crank levers and engageable with said ratchet teeth, connecting elements joining certain ends of the bell-crank levers to the buckets, and counter-weights carried by the other ends of the bell-crank levers.

7. Apparatus of the character described, comprising a sluice-way consisting of an upper supply duct and a lower waste duct communicating through hollow shaft passages, buckets mounted for reciprocation in said passages and arranged to receive water from the supply duct, said buckets descending in the shaft passages due to the weight of the water received and acting to dump said water into the waste duct, means for raising each bucket independently of the other buckets after said bucket has dumped its contents into the waste duct, and means for utilizing movements of the buckets for generating power, each bucket having an opening in its side through which the bucket is filled and emptied.

8. In mechanism of the character described, an upper supply duct, a lower waste duct arranged at a lower elevation than the supply duct, vertical shaft passages connecting the ducts and communicating with the latter, movable gates for preventing water in the supply duct from flowing into the shaft passages, reciprocating buckets in the shaft passages adapted to communicate first with the supply duct and afterwards with the waste duct, said gates being engageable by the buckets and actuated thereby, means for moving each bucket toward the upper ends of the shaft passages independently of the movement of the other buckets, and means for utilizing the reciprocating movement of the buckets for generating power.

GEORGE McF. MOOD.